United States Patent Office
2,873,603
Patented Feb. 17, 1959

2,873,603

METHOD OF TESTING HERMETIC CONTAINERS

Lyle B. Borst, Oak Ridge, Tenn., assignor to the United States of America as represented by the United States Atomic Energy Commission No Drawing. Application June 5, 1946
Serial No. 674,652

4 Claims. (Cl. 73—52)

This invention relates to a method of testing hermetic containers, and more particularly to a method of testing hermetic containers enclosing a material capable of chemically combining with a fluid at elevated temperatures.

In various industrial processes, the occasion arises for testing containers to ascertain how air tight the container may be in that substantial leakage through the container may produce failure of the container resulting from a reaction between the container contents and the surrounding atmosphere, and a halt in operation of the process involved.

For instance, in the neutron irradiation of uranium, cylinders of uranium metal known as slugs are provided with an aluminum jacket and charged into a neutronic reactor such as a graphite pile. Following irradiation for the desired period, the slugs are ejected into a water bath and aged for a period of time such as 30 to 60 days to reduce the radioactivity of the irradiated metal. In order to avoid operational difficulties, such as corrosion of uranium metal by contact with water, or escape of fission products formed during irradiation, it is necessary that rupture of the jacket be avoided. It is therefore highly desirable to test the jacketed slug prior to charging into the pile.

It is accordingly an object of this invention to provide a method of testing hermetic containers.

It is a further object of this invention to provide a simple and accurate method of testing hermetic containers enclosing a material capable of chemically combining with a fluid at elevated temperatures.

It is still another object of this invention to provide a simple and accurate method of testing a jacketed uranium slug prior to charging into a neutronic reactor.

In accordance with my invention, the container to be tested is weighed together with the material therein which is capable of chemically combining with a fluid at elevated temperature. The container and its contents are then immersed in the fluid and heated to a temperature sufficiently high to cause a reaction to take place between the container contents and the fluid and maintained under such conditions for a definite period of time. The container and its contents are then cooled and reweighed. The rate of change in weight is determined and utilized as an index to determine the possibility of container failure.

It may be desirable, in some instances, to subject the container and its contents to an atmosphere of the active fluid at an elevated temperature for a short period of time before the initial weighing to remove any adsorbed water present on the container.

My invention may be illustrated by reference to the testing of a 2.5# uranium slug enclosed in an aluminum jacket. The jacketed slug is heated in a suitable fluid, advantageously a gas such as air, for 24 hours at 280° C. to 300° C. The jacketed slug is then cooled and weighed. The slug is then reheated for 10 days at 280° to 300° C., cooled and reweighed. The rate of change of weight is noted and compared with a predetermined standard to ascertain whether or not the jacketed slug may be charged into a pile.

The weight increase is due to the passage of air through any opening in the aluminum jacket and reaction with the U therein to form oxides.

The method herein described enables testing of any enclosure containing material capable of chemically reacting with a fluid at elevated temperatures and thus permits rejection of unsuitably enclosed material prior to utilization thereof.

Other reactive gases may be utilized in the practice of my invention. For example, in the case of uranium an atmosphere of hydrogen may be utilized, any increase in weight being due to the formation of hydrides.

Numerous uranium slugs have been tested in accordance with the method described herein, and negligible difficulty has been experienced with those considered acceptable.

It will be understood by those skilled in the art that the specifications to be set upon a container will vary depending upon the particular use involved. The following is given as illustrative of a method of setting a tolerance upon a jacketed uranium slug. Assuming a complete pile loading of 100 tons of metal, the average life of a jacket within the pile will be 300 days. If central material is twice as active as the average, the bombardment time of central material will be 150 days. The limiting rate of weight increase will be 6.6 mg./day for central material. This material will be at maximum temperature. An average position would permit 3 mg./day weight increase. In view of such conditions, a maximum permissible weight increase of 1 mg./day may be utilized as the dividing line for the test. Those slugs showing more than 1 mg./day weight increase would be rejected or retested.

While the invention has been described with reference to rate of change of weight as an index of rate of reaction, other indices may be employed such as rate of change of diameter of jacketed slugs, rate of change of length of jacketed slugs and rate of change of density of jacketed slugs.

The invention is particularly adaptable for testing hermetic containers enclosing metals, but may also be applied to containers enclosing other reactive material.

While my invention has been described with reference to certain specific examples and with reference to certain particular embodiments, it is to be understood that it is not to be limited thereby. Therefore, changes, additions and/or omissions may be made without departing from the spirit of my invention as defined in the appended claims which are intended to be limited only as required by the prior art.

I claim:

1. A method of testing hermetic containers enclosing material capable of chemical combination with a fluid at an elevated temperature which comprises weighing said container, immersing said container in said fluid, heating said immersed container to a temperature sufficiently high for said chemical combination to occur for a definite period of time and weighing said container to determine the rate of change of weight for differentiating between acceptable and unacceptable containers.

2. A method of testing a jacketed metal article of known size which comprises the steps of weighing the article to determine its density, heating said jacketed metal article for a definite period of time in an atmosphere of a gas capable of chemically combining with said metal article at a temperature sufficiently high to effect said chemical combination and weighing said container to determine the rate of change of weight for distinguishing between acceptable and unacceptable articles on the basis of rate of change of density.

3. A method of testing uranium metal encased in an aluminum jacket which comprises weighing said encased uranium metal, heating said encased uranium metal in air for a predetermined period at a temperature sufficiently high to form oxides of uranium, cooling said encased uranium metal, and reweighing said encased uranium metal to determine the rate of change of weight for distinguishing between acceptable and unacceptable material.

4. A method of testing an aluminum jacket enclosing uranium metal which comprises weighing said jacket, heating said jacket in an atmosphere of hydrogen for a predetermined period at a temperature sufficiently high to form hydrides of uranium, cooling said jacket, and reweighing it to determine and distinguish between acceptable and unacceptable jackets on the basis of rate of change of weight.

References Cited in the file of this patent

UNITED STATES PATENTS

| | | |
|---|---|---|
| 1,485,895 | Thompson | Mar. 4, 1924 |
| 1,694,828 | McClatchie | Dec. 11, 1928 |
| 2,355,051 | Braucher | Aug. 8, 1944 |
| 2,391,354 | Slosberg | Dec. 18, 1945 |